United States Patent [19]

Mansmann

[11] Patent Number: 4,654,568
[45] Date of Patent: Mar. 31, 1987

[54] MOSFET "H" SWITCH WITH CURRENT SENSING

[75] Inventor: Jeffrey G. Mansmann, Chandler, Ariz.

[73] Assignee: Motorola, Inc., Schaumburg, Ill.

[21] Appl. No.: 898,679

[22] Filed: Aug. 21, 1986

[51] Int. Cl.⁴ .............................................. H02P 1/22
[52] U.S. Cl. .................................. 318/293; 318/256; 318/280; 318/287; 318/291
[58] Field of Search ............... 318/256, 257, 280, 283, 318/284, 287, 289, 291, 293; 307/254, 255, 262, 583; 363/17, 98

[56] References Cited

U.S. PATENT DOCUMENTS

| | | | |
|---|---|---|---|
| 4,103,188 | 7/1978 | Morton | 307/255 X |
| 4,216,388 | 8/1980 | Wilson | 307/255 X |
| 4,454,454 | 6/1984 | Valentine | 318/257 X |
| 4,476,401 | 10/1984 | Lin | 307/262 X |
| 4,488,068 | 12/1984 | Janutka | 307/583 X |

Primary Examiner—William M. Shoop, Jr.
Assistant Examiner—Bentsu Ro
Attorney, Agent, or Firm—Joe E. Barbee

[57] ABSTRACT

Current sensing of current through an "H" switch circuit is accomplished without the use of a dropping resistor. The current sensing is provided by using current sensing field effect transistors in conjunction with power field transistors.

4 Claims, 3 Drawing Figures

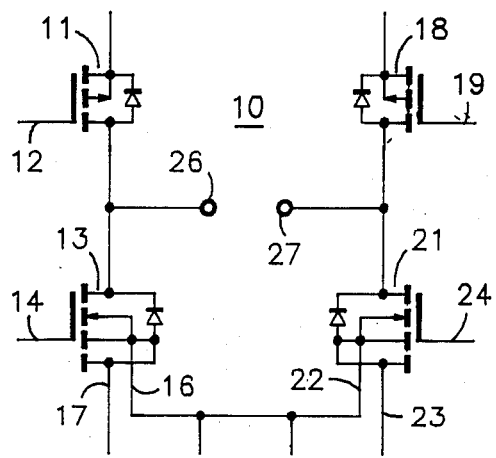
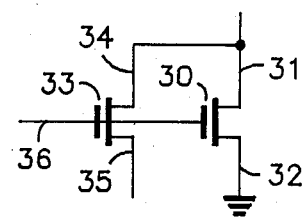
FIG. 1    FIG. 2
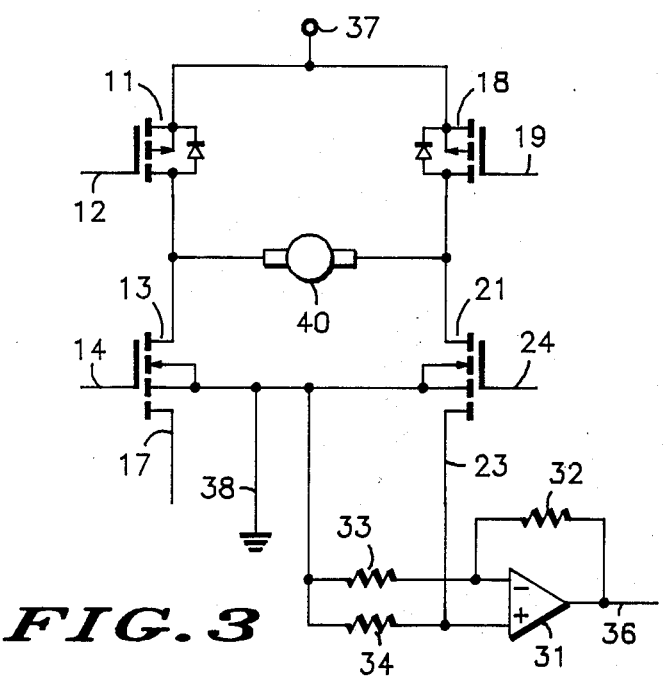
FIG. 3

MOSFET "H" SWITCH WITH CURRENT SENSING

BACKGROUND OF THE INVENTION

This invention relates, in general, to power field effect transistors (FET), and more particularly, to a FET "H" Switch circuit having current sensing capabilities.

A typical field effect "H" switch circuit is disclosed in U.S. Pat. No. 4,454,454 which issued June 12, 1984 to Valentine. Such circuits are useful for providing bidirectional control to a load such as a motor. The "H" switch is suitable for motor drives and reversing switches. In applications where current sensing is needed it is usually achieved by sensing a voltage drop across a resistor in series with the "H" switch circuit. However, the power dissipated in such resistors reduces the efficiency of the circuit. Therefore, it would be desirable to provide an improved means for sensing current in an "H" switch circuit.

Accordingly, it is an object of the present invention to provide a method for sensing current in an "H" switch circuit which does not result in an appreciable loss of current.

Another object of the present invention is to provide a current sensing arrangement for an "H" switch circuit which does not appreciably deprive drive current from a load.

Yet a further object of the present invention is to provide a current sensing scheme at reduced cost useful in an "H" switch circuit.

SUMMARY OF THE INVENTION

The above and other objects and advantages of the present invention are provided by using a field effect transistor sensing device in an "H" switch circuit arrangement. The current sensing field effect transistors replace a switching device in each leg of the "H" switch circuit. The current sensing field effect transistor can be represented as two FET transistors having their drain connected together and their gate electrodes connected together. Typically, one of the transistors will be capable of handling a larger amount of current than the other wherein the one handling the larger amount of current is used as the transistor carrying the drive current while the other transistor is a current sensing transistor. Since the two transistors will have a predetermined ratio, the current obtained from the source of the smaller transistor is a direct indication of the current carried by the larger transistor.

BRIEF DESCRIPTION OF THE DRAWINGS

FIG. 1 illustrates the "H" switch circuit of the present invention having current sensing capability;

FIG. 2 shows an alternate schematic illustration of the current sensing FET of FIG. 1; and FIG. 3 illustrates a typical current sensing circuit useful with the present "H" switch circuit.

DETAILED DESCRIPTION OF THE DRAWINGS

FIG. 1 illustrates the "H" switch circuit 10 of the present invention. A first leg of "H" switch circuit 10 includes a field effect transistor 11 and a current sensing field effect transistor 13. Field effect transistor 11 has been illustrated as a P-channel transistor having a gate electrode 12 and having a diode across its source and drain terminals. The cathode of the diode is connected to the source electrode while the anode of the diode is connected to the drain electrode of transistor 11. Since FET 11 is a power device, the diode is an inherent part of the structure of FET 11. The drain electrode of FET 11 is connected to a drain electrode of current sensing FET 13. A node 26 is located between transistors 11 and 13 and serves as a load terminal. Current sensing FET 13 has a gate electrode 14, a first source electrode 16 and a second source electrode 17. Source electrode 16 carries the driving current for the load being driven by "H" switch 10 while source electrode 17 carries the sensing current.

A second leg of FET "H" switch circuit 10 has a power FET 18 and a current sensing FET 21 connected in series. Power FET 18 has a gate electrode 19 and is the same as power FET 11. Current sensing FET 21 is the same as FET 13. Current sensing FET 21 has a gate electrode 24, a current sensing source 23 and a drive current source 22. A node 27 is located between FETs 18 and 21 and serves as a second load terminal. In a typical circuit using "H" switch 10, a load, such as a motor, would be connected between nodes 26 and 27. In order for current to pass through the load, connected to the nodes or terminals 26 and 27, transistors 11 and 21 are energized or else transistors 18 and 13 are energized. This operation will become more apparent hereinafter.

FIG. 2 illustrates a more conventional schematic for current sensing FETs 13 and 21 (of FIG. 1). FET 30 has a drain electrode 31 connected to a drain electrode 34 of a FET 33. The gate electrodes of FETs 30 and 33 are connected together and illustrated as gate electrode 36. FET 30 is a power FET and has its source 32 illustrated as being connected to ground. FET 33 is a current sensing FET and has a source electrode 35 which provides an output current which is a predetermined ratio of the current carried by FET 30. Transistors 30 and 33 can be any type of FET device; however, preferably comprise a vertical power structure having a substrate serving as a drain. This arrangement allows for a cellular construction of the devices wherein transistor 33 may comprise a single cell or a plurality of cells such as ten to twenty, and FET 30 may comprise a plurality of cells in parallel. As an example, transistor 30 may comprise several thousand cells. In all cases the number of cells between transistors 30 and 33 is a fixed number and is chosen to be some convenient ratio. Typically the current carried by transistor 33 would be a very small fraction of the current carried by transistor 30. As an example, transistor 33 may carry 0.1 percent of the current carried by transistor 30.

FIG. 3 illustrates the "H" switch circuit 10 of FIG. 1 connected to a load and to a circuit to monitor the sensed current. A motor 40 is illustrated as a load connected to the load terminals. The current carrying sources of FETs 13 and 21 are connected to a ground terminal 38. The sources of P-channel transistors 11 and 18 are connected to a voltage terminal 37. Terminals 37 and 38 provide the required power to drive the load 40. When it is desired to apply power to load 40, transistors 11 and 21 are enabled which will provide current flow through load 40 in one direction. To reverse the current flow through load 40, transistors 11 and 21 are disabled and transistors 18 and 13 are enabled, thereby allowing current to flow through load 40 in the opposite direction. This provides bidirectional control of current through load 40.

The current provided through load 40 in one direction is sensed by source 23 while the current supplied to load 40 in the opposite direction is sensed by source 17. A circuit for converting this current to voltage output is illustrated as being connected to source 23. An identical circuit would be connected to source 17, however is not illustrated in order to avoid over crowding FIG. 3. A differential amplifier 31 has an inverting input connected to a resistor 33 and to a resistor 32. Amplifier 31 has its non-inverting input connected to a resistor 34 and to source 23. Resistor 32 is connected from the inverting input of amplifier 31 to output 36. Resistor 33 is connected between the current drive sources of transistors 13 and 21 and the inverting input of amplifier 31. Resistors 33 and 32 serve to establish the gain of differential amplifier 31. Resistor 34 is a sense resistor connected between the current drive source electrodes of transistors 13 and 21 and to the non-inverting input of amplifier 31. The connection to the power source electrodes of transistors 13 and 21 is commonly called a "Kelvin" connection and provides a non-inductive connection to ground which is useful for the current sensing circuitry. Output 36 can be connected to any suitable circuitry such as a comparator.

By now it should be appreciated that there has been provided an inexpensive and efficient manner of sensing current provided by a bidirectional "H" switch circuit.

I claim:

1. An "H" switch circuit for providing bidirectional control to a load, comprising: a first power FET having a first current carrying electrode for coupling to a power supply, a second current carrying electrode, and a gate electrode for receiving a control signal; a second power FET having a first current carrying electrode coupled to the second current carrying electrode of the first power FET, a second current carrying electrode for coupling to the power supply, and a gate electrode for receiving a control signal; a third power FET having a first current carrying electrode for coupling to a power supply, a second current carrying electrode, and a gate electrode for receiving a control signal; a fourth power FET having a first current carrying electrode coupled to the second current carrying electrode of the third power FET, a second current electrode for coupling to the power supply; a fifth FET for sensing current having a first current carrying electrode coupled to the first current carrying electrode of the second power FET, a gate electrode coupled to the gate electrode of the second power FET, and a second current carrying electrode for providing a small fraction of the current carried by the second power FET; and a sixth FET for sensing current having a first current carrying electrode coupled to the first current carrying electrode of the fourth power FET, a gate electrode coupled to the gate electrode of the fourth power FET, and a second current carrying electrode for providing a small fraction of the current carried by the fourth power FET.

2. The "H" switch circuit of claim 1 wherein the first and second power FETs form a first node therebetween and the third and fourth power FETs form a second node therebetween so that the load may be coupled between the first and second nodes.

3. An "H" switch circuit for providing bidirectional control to a load while providing current sensing means, comprising: first and second series connected power FETs and forming a first node therebetween; third and fourth series connected power FETs and forming a second node therebetween so that the load may be coupled between the first and second nodes; a first current sensing FET having its gate and drain electrodes connected in common with gate and drain electrodes of the second power FET; and a second current sensing FET having its gate and drain electrodes connected in common with gate and drain electrodes of the fourth power FET, wherein source electrodes of the first and the second current sensing FET provides a small portion of the current carried in the first and second series connected power FETs and in the third and fourth series connected power FETs respectively.

4. An "H" switch circuit for providing bidirectional control to a load comprising a first FET having a first current carrying electrode for coupling to a first power supply terminal, a gate electrode for receiving a control signal, and a second current carrying electrode coupled to a first load terminal; a second FET having a first current carrying electrode coupled to the first load terminal, a gate electrode for receiving a control signal, a second current carrying electrode for coupling to a second power supply terminal, and a third current carrying electrode for supplying a small portion of the current carried by the first current carrying electrode of the second FET; a third FET having a first current carrying electrode for coupling to the first power supply terminal, a gate electrode for receiving a control signal; and a second current carrying electrode coupled to a second load terminal; and a fourth FET having a first current carrying electrode coupled to the second load terminal, a gate electrode for receiving a control signal, a second current carrying electrode for coupling to the second power supply terminal, and a third current carrying electrode for supplying a small portion of the current carried by the first current carrying electrode of the fourth FET.

* * * * *